(12) United States Patent
Wiese

(10) Patent No.: US 7,259,554 B2
(45) Date of Patent: Aug. 21, 2007

(54) ANGLE POSITION SENSOR WITH INNER AND OUTER MAGNETIC RINGS

(75) Inventor: Peter Wiese, Kelkheim (DE)

(73) Assignee: Siemens AG, München (DE)

( * ) Notice: Subject to any disclaimer, the term of this patent is extended or adjusted under 35 U.S.C. 154(b) by 45 days.

(21) Appl. No.: 11/129,415

(22) Filed: May 16, 2005

(65) Prior Publication Data

US 2006/0267581 A1 Nov. 30, 2006

Related U.S. Application Data

(63) Continuation of application No. PCT/DE03/03621, filed on Oct. 31, 2003.

(30) Foreign Application Priority Data

Nov. 21, 2002 (DE) .............................. 102 54 552

(51) Int. Cl.
*G01B 7/30* (2006.01)
(52) U.S. Cl. .......................... 324/207.25; 324/207.21; 324/207.2
(58) Field of Classification Search . 324/207.2–207.25
See application file for complete search history.

(56) References Cited

U.S. PATENT DOCUMENTS 6,130,535 A * 10/2000 Herden et al. ........... 324/207.2
6,201,389 B1 * 3/2001 Apel et al. ............... 324/207.2
6,222,359 B1 4/2001 Duesler
6,310,473 B1 10/2001 Zhao
6,479,987 B1 * 11/2002 Marx et al. .............. 324/207.2

FOREIGN PATENT DOCUMENTS

DE 196 34 282 A1 2/1998

OTHER PUBLICATIONS

DE-19634282.1; Robert Bosch GmbH, D-70469 Stuttgart.

* cited by examiner

*Primary Examiner*—Jay M. Patidar

(57) ABSTRACT

The invention relates to an angle position sensor, for recording the angular position of a component which may rotate about a rotational axis, including a magnetic ring, fixed to the component coaxially to the rotation axis, magnetised perpendicularly to the rotation axis and surrounded on the outer circumference thereof by a ferromagnetic external screening ring. A magnetic sensor element is further provided, arranged radially and fixed within the magnetic ring. The rotating component is surrounded by an inner ferromagnetic screening ring, arranged coaxially to the rotation axis and approximately radially with relation to the outer screening ring, which is further surrounded by an inner magnetic ring. The inner screening ring and the inner magnetic ring are fixed to the rotating component and the magnetic sensor element is arranged in an annular gap, formed between the outer magnetic ring and the inner magnetic ring.

18 Claims, 4 Drawing Sheets

ANGLE POSITION SENSOR WITH INNER AND OUTER MAGNETIC RINGS

CROSS REFERENCE TO RELATED APPLICATIONS

The present application is a continuation of international application PCT/DE03/03621 filed Oct. 31, 2003 and further claims priority to German patent application 10254552.9 filed Nov. 21, 2002, the both of which are herein incorporated by reference.

BACKGROUND OF THE INVENTION

The invention relates to an angle position sensor for detection of the angle position of a component which can rotate about a rotation axis, in particular a throttle valve position sensor, having a magnet ring which has one or more parts and is connected in a rotationally fixed manner to the component, coaxially with respect to the rotation axis, is magnetized transversely with respect to the rotation axis and is surrounded on its external circumference by a ferromagnetic outer shielding ring, and having a magnetic sensor element which is arranged in a fixed position radially within the magnet ring.

Known angle position sensors such as these are in the form of magnetoresistive sensors or Hall sensors.

In the case of magnetoresistive sensors, the magnet ring produces an exciting field which rotates about the active center of the sensor element. The use of resistance elements connected in the form of a Wheatstone bridge to form the sensor element results in a sine function and a cosine function, so that the angle to be measured can be determined by forming the arctan.

Hall sensors produce a signal which is proportional to the magnetic induction. They have good resistance to magnetic disturbance fields, since such fields are kept away from the Hall sensor by the outer shielding ring.

These known angle position sensors require a central arrangement within the magnet ring, in order to make it possible to produce the sinusoidal and cosinusoidal signals correctly.

Furthermore, it is not possible to use a component which can rotate and is composed of a ferromagnetic material since, otherwise, this would result in a highly inhomogeneous field profile. Since the magnetic reluctance in iron is several orders of magnitude less than that in air, a greater proportion of the lines of force is deflected toward the component which can rotate. This is evident by the fact that the field amplitudes differ widely in the vertical and horizontal directions. Without complex correction, the signals that are produced are no longer suitable for angle calculation.

The use of a Hall sensor to determine angles is also difficult when using a component which can rotate and is formed from a ferromagnetic material, since this component is arranged in the immediate vicinity of the flux guide pieces of the Hall sensor, so that a large proportion of the magnetic flux is short-circuited by the component which can rotate. Exact matching of the characteristics of the sensor is possible only in the assembled state, and this is associated with increased production costs.

SUMMARY OF THE INVENTION

One object of the invention is to provide an angle position sensor of the type mentioned initially, which may be in the form of a hollow shaft sensor which allows the use of a low-wear and low-cost material for the component which can rotate, is of simple design and allows angles to be determined with high accuracy in a simple manner.

According to the invention, this object is achieved in that the component which can rotate is surrounded by a ferromagnetic inner shielding ring which is arranged coaxially with respect to the rotation axis and approximately radially with respect to the outer shielding ring and is in turn surrounded by an inner magnet ring which has one or more parts, with the inner shielding ring and the inner magnet ring being connected in a rotationally fixed manner to the component which can rotate, and with the magnetic sensor element being arranged in an annular gap which is formed between the outer magnet ring and the inner magnet ring, with magnetization of the inner magnet ring which opposes the magnetization of the outer magnet ring and being designed such that the magnetic flux density at the location of the inner shielding ring corresponds approximately to the magnetic flux density when no inner shielding ring is present.

There is no need to arrange the sensor element centrally, thus allowing the formation to be designed as a hollow shaft sensor. This also makes it possible to arrange the angle position sensor not only at an axial end of the component which can rotate but also surrounding the component, possibly at a point where access is difficult.

The design of the magnetization of the inner magnet ring means that there is no field in the interior of the inner shielding ring, so that the material used for the component which can rotate and which will be introduced into the interior of the inner shielding ring later is irrelevant.

The arrangement of the inner magnet ring means that, even if the inner shielding ring is designed with low permeability (for example $\mu r=100$), it will have no influence on the characteristic of the sensor element, irrespective of whether a ferromagnetic component which can rotate is or is not present. The curves of the induction profile remain coincident.

The component which can rotate may be formed from a ferromagnetic material. Ferromagnetic materials cost little and are easily available. Furthermore, they can be hardened and are thus subject to little wear.

The use of the inner shielding ring and the inner magnet ring means that the field profile of the lines of force is kept highly homogeneous even in the presence of a ferromagnetic component, thus allowing exact angle measurement using magnetoresistive sensors.

If induction measurement is used for evaluation, for example by means of a Hall sensor, this prevents any magnetic short circuit between its flux guide pieces and the ferromagnetic component which can rotate.

The inner magnet ring compensates for the reflection of the lines of force of the outer magnet ring resulting from the ferromagnetic material of the component which can rotate.

The component which can rotate may be a shaft, in particular a throttle valve shaft of a throttle flap valve.

The inner magnet ring and the outer magnet ring may be magnetized either radially or else diametrically.

If the magnet rings and shielding rings entirely or partially surround the component which can rotate, this results in a large amount of freedom for the arrangement of the angle position sensor.

One advantageous embodiment of the magnetic sensor element comprises a magnetoresistive sensor. This is possible because the lines of force run essentially completely parallel and are not deflected toward or away from the inner shielding ring, so that the induction profile of the normal and tangential components is sinusoidal or cosinusoidal, respectively, and the peak values of the two signals are the same. In this case, the magnetoresistive sensor may be an AMR sensor (Anisotropic Magneto Resistor).

Owing to the shielding effect of the two shielding rings, the magnetoresistive sensor may also be a GMR sensor (Giant Magneto Resistor), even though this is a highly sensitive sensor. Owing to the shielding, magnetic disturbance fields do not adversely affect the signal from this sensor.

If the AMR sensor or the GMR sensor is formed in particular from four resistance elements connected in the form of a Wheatstone bridge, then the resistance elements emit a complete sinusoidal function over half a revolution of the component which can rotate in the case of an AMR sensor, or over one entire revolution of the component which can rotate in the case of a GMR sensor.

If, furthermore, the magnetic sensor element comprises two AMR sensors or GMR sensors which are shifted electrically through 90°, then this results in a sinusoidal function and a cosinusoidal function, so that the angle can be determined within 180° (in the case of AMR sensors) or 360° (in the case of GMR sensors) by forming the arctan.

Another advantageous embodiment of the magnetic sensor element comprises a Hall sensor, with the Hall sensor preferably being formed from a Hall element which is arranged in a measurement air gap between two flux guide pieces.

Between the points of inflection of the function of the signal from the Hall sensor, that is to say at points with the maximum induction magnitude, when the magnetization is at right angles to the measurement air gap, two areas of in each case about 150° exist with little linearity error. Good linearity of the induction profile over the rotation angle is obtained even with an embodiment without an inner ring magnet, and is also an embodiment of the invention. However, a further positive effect becomes clear with an inner ring magnet, specifically that the signal in the measurement air gap is considerably amplified by the contribution of the inner magnet ring, since the flux components of the two magnets are in the same direction in the measurement air gap. In particular, however, the inner magnet ring prevents the ferromagnetic component which can rotate from acting as a magnetic short circuit between the adjacent flux guide pieces.

The signal-amplifying effect of the inner magnet ring makes it possible to use low-cost, in particular plastic-bonded hard ferrite magnets, instead of expensive rare-earth magnets, as in the case of the magnetoresistive sensors, as well. The flux guide pieces are preferably formed from a soft-magnetic material, in particular from nickel-iron.

A physically advantageous design is obtained when the flux guide pieces are obtained by the flux guide pieces being in the form of two essentially semicircular segments, which are arranged symmetrically with respect to the rotation axis and between whose mutually facing ends two measurement air gaps are formed, with a Hall element being arranged in at least one of the measurement air gaps.

BRIEF DESCRIPTION OF THE SEVERAL VIEWS OF THE DRAWINGS

Exemplary embodiments of the invention will be described in more detail in the following text and are illustrated in the drawing, in which.

DETAILED DESCRIPTION OF THE INVENTION

Figure 1:
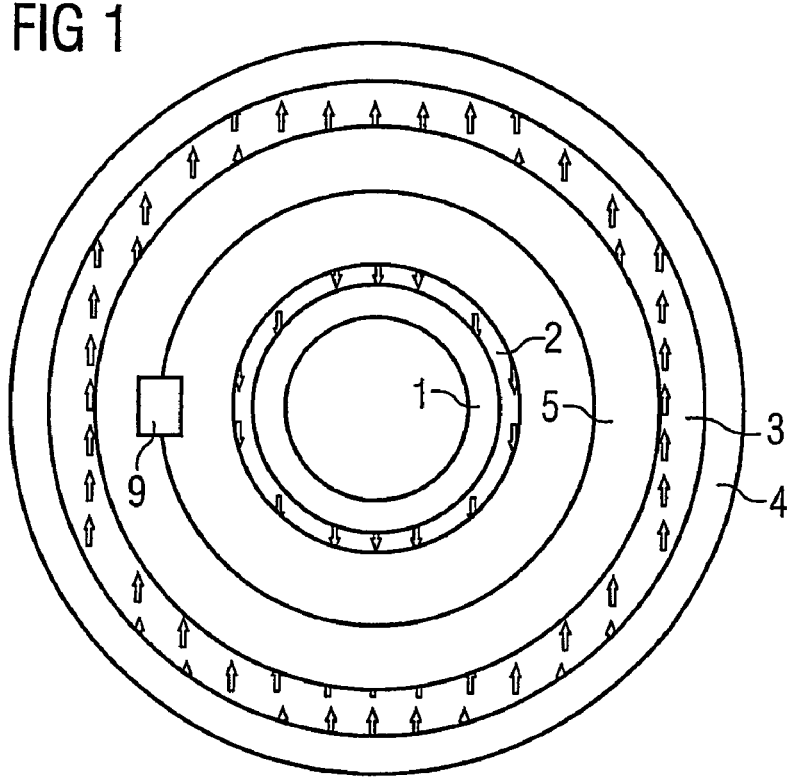
FIG. 1 shows a schematic view of a first exemplary embodiment of an angle position sensor.

The angle position sensors illustrated in the figures have a ferromagnetic inner shielding ring 1, which is surrounded by an inner magnet ring 2, 2'. An outer magnet ring 3, 3', which is in turn surrounded by a ferromagnetic outer shielding ring 4, is arranged coaxially surrounding the inner magnet ring 2, 2', at a radial distance.

The radial distance between the inner and outer magnet rings 2, 2' and 3, 3' forms an annular gap 5.

Figure 7:
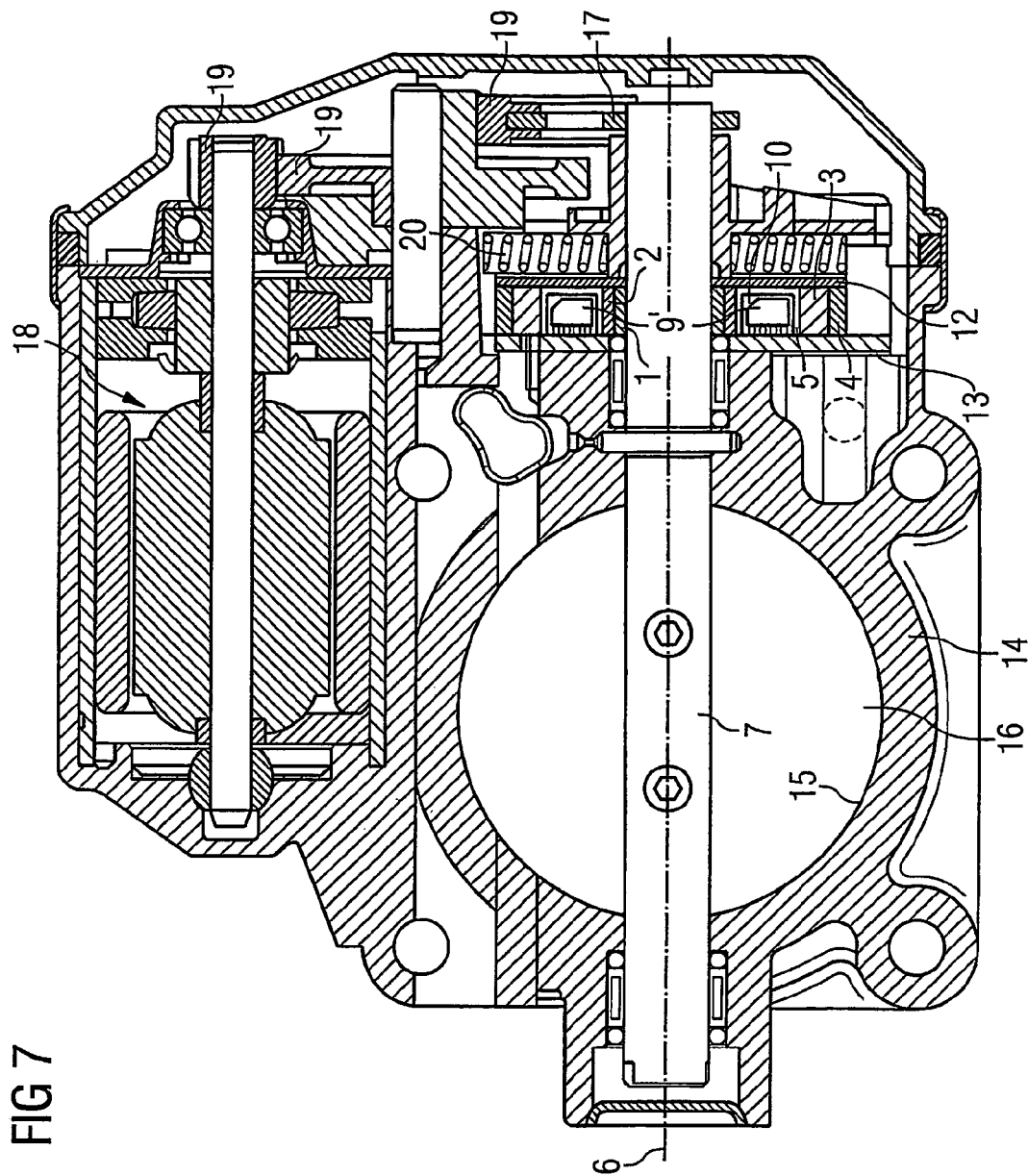
FIG. 7 shows a cross section through a throttle valve connecting stub with an angle position sensor.

The inner and outer shielding rings 1 and 4 as well as the inner and outer magnet rings 2, 2' and 3, 3' are connected in a rotationally fixed manner to a component which can rotate about a rotation axis 6 and which, in FIG. 7, is the throttle valve shaft 7 (which is composed of a ferromagnetic material) of a throttle valve connecting stub for an internal combustion engine.

Figure 3:
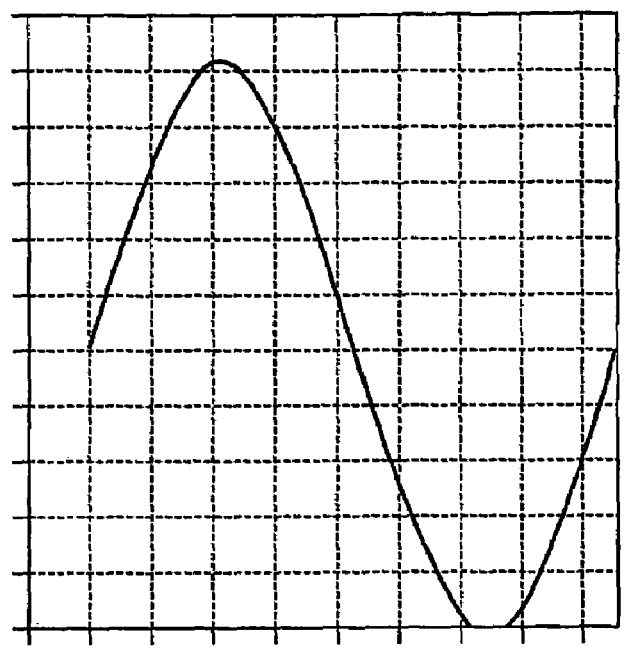
FIG. 3 shows a sinusoidal output signal from a sensor element of the angle position sensor as shown in FIG. 1.

In the exemplary embodiments shown in FIGS. 1 and 3, both the inner magnet ring 2 and the outer magnet ring 3 are magnetized diametrically, as is illustrated by arrows. The magnetization of the inner magnet ring 2 is in the opposite direction to the magnetization of the outer magnet ring 3.

Figure 6:
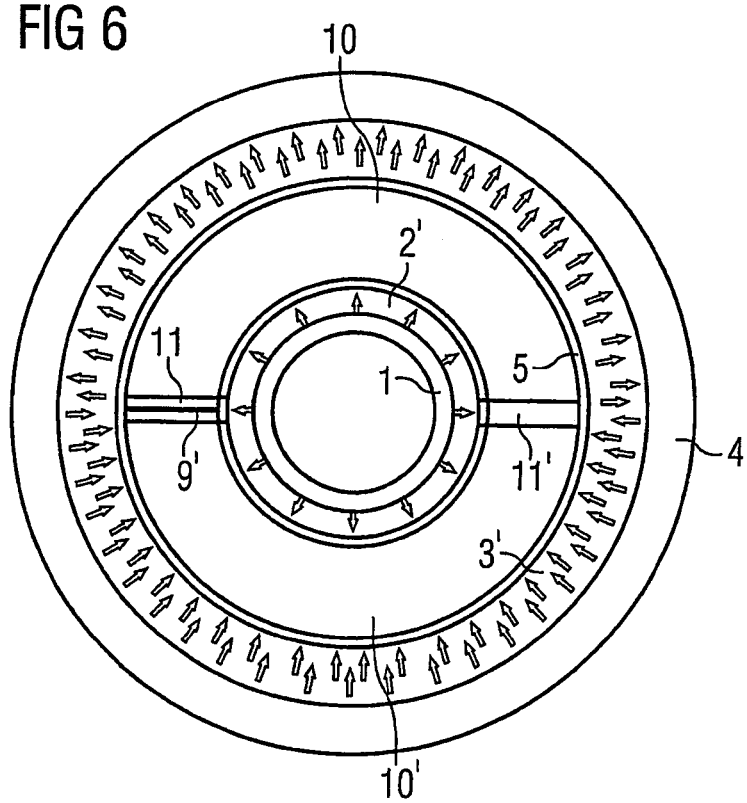
FIG. 6 shows a schematic view of a third exemplary embodiment of an angle position sensor.

The magnetizations of the inner and outer magnet rings 2' and 3' in the exemplary embodiment shown in FIG. 6 are also in opposite directions to one another, as is likewise illustrated by arrows. However, in FIG. 6, the magnetizations of the inner and outer magnet rings 2' and 3' are radial.

Figure 2:
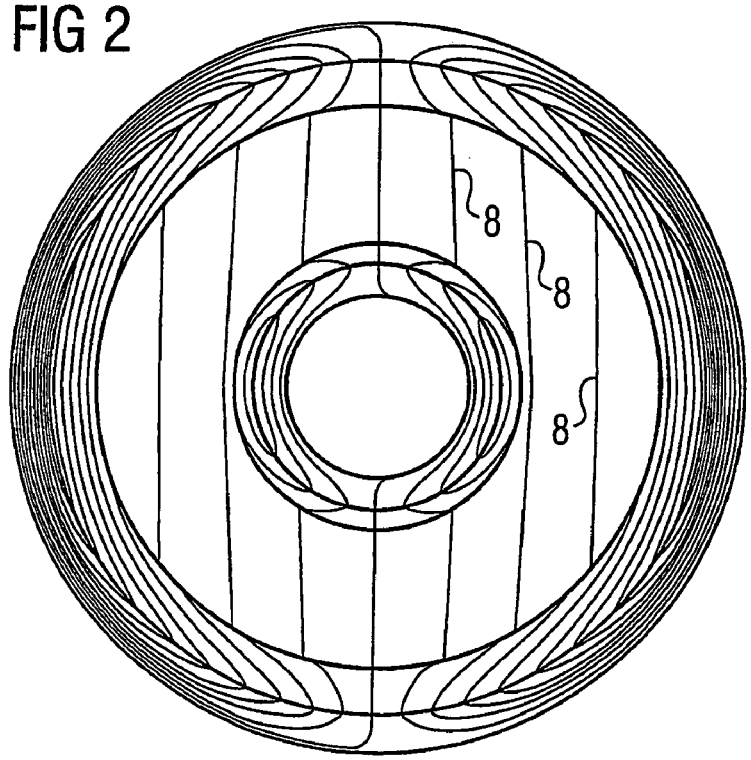
FIG. 2 shows an illustration of the profile of the lines of force of the angle position sensor shown in FIG. 1.

The magnetization of the inner magnet ring 2, 2' is designed such that, in conjunction with the magnetization of the outer magnet ring 3, 3', the flux density at the location of the inner shielding ring 1 is of precisely the same magnitude as it would be if this inner shielding ring 1 were not present. The inner magnet ring 2, 2' thus forms a compensation magnet. There is therefore no field in the interior of the inner shielding ring 1, so that the ferromagnetic throttle valve shaft 7 in FIG. 7 has no influence on the field profile. The lines of force 8 run parallel to one another throughout the entire area of the annular gap 5, and are not deflected toward or away from the inner shielding ring 1. This is clearly illustrated in FIG. 2.

A magnetic sensor element is arranged fixed in the annular gap 5.

Figure 4:
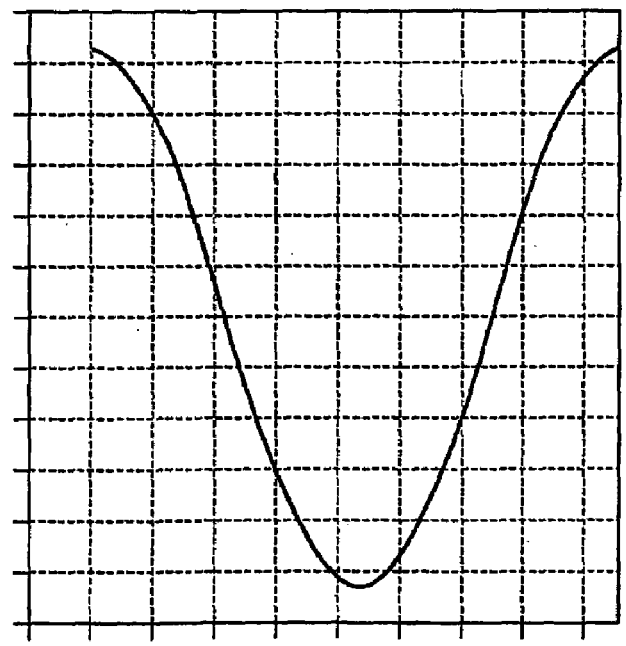
FIG. 4 shows a cosinusoidal output signal from a sensor element of the angle position sensor as shown in FIG. 1.

In the exemplary embodiment shown in FIG. 1, the magnetic sensor element 9 is formed from two magnetoresistive sensors, which are shifted through 90° and are each formed from four resistance elements which are connected in the form of a Wheatstone bridge. The magnetoresistive sensors emit a sinusoidal signal (FIG. 3) and a cosinusoidal signal (FIG. 4) over one revolution of the throttle valve shaft 7. The angle position can then be determined from these signals by formation of the arctan in an evaluation circuit.

Figure 5:
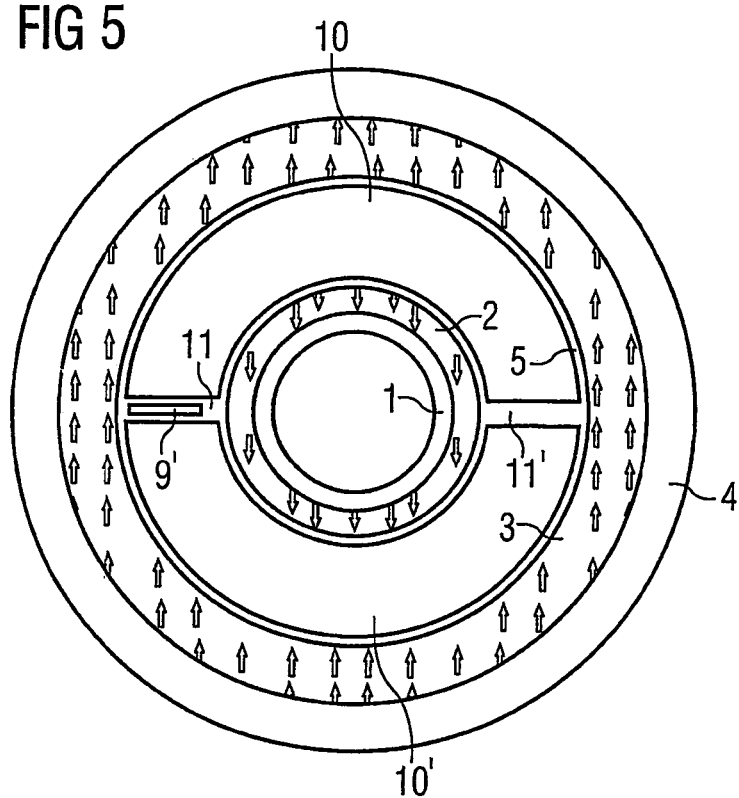
FIG. 5 shows a schematic view of a second exemplary embodiment of an angle position sensor.

In the exemplary embodiments shown in FIGS. 5 and 6, two flux guide pieces 10, 10', which are in the form of semicircular elements, are arranged in the annular gap 5, fixed coaxially with respect to the rotation axis 6, and are composed of nickel-iron.

Gaps which are used as measurement air gaps 11, 11' are located between the mutually facing ends of the flux guide pieces 10, 10'. A magnetic sensor element 9' in the form of a Hall element is arranged in the measurement air gap 11, can detect the respective magnetic flux, and can emit a signal which corresponds to the angle position.

As can be seen in FIG. 7, the inner shielding ring 1 is arranged in a rotationally fixed manner on the throttle valve shaft 7. An annular holding plate 12 is attached axially to the inner shielding ring 1, extends radially outwards, and is likewise axially in contact with and is attached to the inner and outer magnet rings 2, 3, as well as the outer shielding ring 4.

The flux guide pieces 10 and 10', only one of which can be seen, are arranged in the annular gap 5. The magnetic sensor elements 9' can be seen in front of the revolving ends of this flux guide piece 10, and their signals are supplied to the evaluation circuit which is arranged on a circuit mount 13. The circuit mount 13 is also fitted with the flux guide pieces 10, 10'.

The throttle valve connecting stub has a housing 14 with a continuous through-flow opening 15, which can be blocked by a throttle valve 16.

The throttle valve 17 is arranged at a distance from the angle position sensor, on the throttle valve shaft 7, which is mounted in the housing 14 such that it can rotate.

A drive pinion of a gearbox 19 is arranged at the opposite end of the throttle valve shaft 7 to the throttle valve 16, via which the throttle valve shaft 7 can be driven to rotate by an electric motor 18 against the force of a resetting spring 20, and the throttle valve 16 can be pivoted from a closed position to an open position.

The invention claimed is:

1. An angle position sensor for detection of an angle position of a component which can rotate about a rotation axis comprising:
    a magnet ring connected in a rotationally fixed manner to the component, coaxially with respect to the rotation axis, and magnetized transversely with respect to the rotation axis;
    a ferromagnetic outer shielding ring surrounding an external circumference of the magnetic ring;
    a magnetic sensor element which is arranged in a fixed position radially within the magnet ring;
    a ferromagnetic inner shielding ring which is arranged coaxially with respect to the rotation axis and approximately radially with respect to the outer shielding ring, wherein the inner shielding ring surrounds the component; and
    an inner magnet ring arranged so as to surround the inner shielding ring, wherein the inner magnet ring and the inner shielding ring are connected in a rotationally fixed manner to the component which can rotate, wherein the magnetic sensor element is arranged in an annular gap which is formed between the outer magnet ring and the inner magnet ring, wherein magnetization of the inner magnet ring which opposes the magnetization of the outer magnet ring and being designed such that a magnetic flux density at a location of the inner shielding ring corresponds approximately to a magnetic flux density when no inner shielding ring is present.

2. The angle position sensor according to claim 1, wherein the component which can rotate comprises a ferromagnetic material.

3. The angle position sensor according to claim 1, wherein the component which can rotate is one of a shaft and a throttle valve shaft for a throttle flap valve.

4. The angle position sensor according to claim 1, wherein the inner magnet ring and the outer magnet ring are radially magnetized.

5. The angle position sensor according to claim 1, wherein the inner magnet ring and the outer magnet ring are magnetized diametrically.

6. The angle position sensor according to claim 1, wherein the magnet rings and shielding rings entirely or partially surround the component which can rotate.

7. The angle position sensor according to claim 1, wherein the magnetic sensor element is a magnetoresistive sensor.

8. The angle position sensor according to claim 7, wherein the magnetoresistive sensor is an Anisotropic Magneto Resistor sensor.

9. The angle position sensor according to claim 8, wherein the Anisotropic Magneto Resistor sensor comprises four resistance elements which are connected in the form of a Wheatstone bridge.

10. The angle position sensor according to claim 9, wherein the magnetic sensor element is formed from two AMR sensors which, are electrically shifted through 90°.

11. The angle position sensor according to claim 7, wherein the magnetoresistive sensor is a Giant Magneto Resistor sensor.

12. The angle position sensor according to claim 11, wherein the Giant Magneto Resistor sensor comprises four resistance elements which are connected in the form of a Wheatstone bridge.

13. The angle position sensor according to claim 12, wherein the magnetic sensor element is formed from two Giant Magneto Resistor sensors which are electrically shifted through 90°.

14. The angle position sensor according to claim 1, wherein the magnetic sensor element is a Hall sensor.

15. The angle position sensor according to claim 14, wherein the Hall sensor is formed from a Hall element which is arranged in a measurement air gap between two flux guide pieces.

16. The angle position sensor according to claim 15, wherein the flux guide pieces are formed from a soft-magnetic material.

17. The angle position sensor according to claim 16, wherein the material is nickel iron.

18. The angle position sensor according to claim 15, wherein the flux guide pieces are in the form of two substantially semicircular segments which are arranged substantially symmetrically with respect to the rotation axis in the annular gap between the inner and outer magnet ring, and two measurement air gaps are formed between mutually facing ends, with a Hall element being arranged in at least one of the measurement air gaps.

* * * * *